United States Patent [19]
Sato

[11] Patent Number: 5,796,912
[45] Date of Patent: Aug. 18, 1998

[54] DIGITAL SIGNAL RECORDING/ REPRODUCING APPARATUS CAPABLE OF RECORDING SEQUENCE SIGNALS IN SLANTED AND LONGITUDINAL TRACKS ON A MAGNETIC TAPE

[75] Inventor: Yoshinori Sato, Kanagawa, Japan

[73] Assignee: Sony Corporation, Tokyo, Japan

[21] Appl. No.: 74,293

[22] Filed: Jun. 9, 1993

[30] Foreign Application Priority Data

Jun. 15, 1992 [JP] Japan ................................. 4-178829

[51] Int. Cl.$^6$ ................................. G11B 5/02; H04N 5/91
[52] U.S. Cl. ................................. 386/96; 386/52; 360/48; 360/18; 360/53
[58] Field of Search ................................. 360/14.1, 19.1, 360/27, 13, 53, 22, 47, 18, 48; 235/437; 386/52, 96, 95

[56] References Cited

U.S. PATENT DOCUMENTS

| | | | |
|---|---|---|---|
| 4,528,603 | 7/1985 | Abe | 360/70 |
| 4,896,025 | 1/1990 | Hasegawa | 235/437 |
| 4,903,148 | 2/1990 | Amano et al. | 360/13 |
| 4,914,527 | 4/1990 | Asai et al. | 360/10.3 |
| 5,253,128 | 10/1993 | Ike et al. | 360/27 |
| 5,311,372 | 5/1994 | Matsumi et al. | 360/19.1 |

FOREIGN PATENT DOCUMENTS 0509641 10/1992 European Pat. Off. ............... 360/27
4-47567 2/1992 Japan.

*Primary Examiner*—Andrew L. Sniezek
*Assistant Examiner*—Larry T. Cullen
*Attorney, Agent, or Firm*—Frommer Lawrence & Haug LLP; William S. Frommer

[57] ABSTRACT

In an apparatus for recording and/or reproducing digital audio and video signals in slanted tracks on a magnetic tape, an integral number of samples of the digital audio signals, which forms a unit thereof, are allocated to a plurality of fields of the digital video signals. Sequence signals are recorded in both slanted and longitudinal tracks on the tape. The sequence signals indicate the conclusion of the digital audio data, that is, the units of the digital audio signals on the basis of the fields of the digital video signals. During reproduction of the sequence signals, the error rate of the sequence signals reproduced from the slanted and longitudinal tracks, respectively, are detected. Based on the detected error rate, the sequence signals reproduced from either the slanted tracks or the longitudinal tracks are selected. Therefore, if the sequence signals are lost or distorted on either the slanted or longitudinal tracks, the sequence signals may be still reproduced from the other track.

18 Claims, 12 Drawing Sheets

DIGITAL SIGNAL RECORDING/ REPRODUCING APPARATUS CAPABLE OF RECORDING SEQUENCE SIGNALS IN SLANTED AND LONGITUDINAL TRACKS ON A MAGNETIC TAPE

BACKGROUND OF THE INVENTION

1. Field of the Invention

This invention relates to a recording and/or reproducing apparatus for recording digital audio data based on a predetermined recording unit. More particularly, it relates to a recording/reproducing apparatus for recording digital audio data simultaneously with digital video data on slanted tracks on a magnetic tape (digital VTR).

2. Description of the Related Art

In a conventional DVTR (digital vide tape recorder), video signals and audio signals are separately translated into digital video data and digital audio data which are recorded on the slanted track(s) or helical track(s) on the magnetic tape.

With the above-described digital VTRs, such as the so-called D-2 format composite digital VTR, the digital video data and digital audio data are recorded in accordance with a recording format shown in FIG. 1.

That is, in FIG. 1, the digital video data and digital audio data are recorded on the helical track $TR_{HEL}$ of a magnetic tape TP. An analog audio cue track $TR_{AC}$, a control (CTL) track $TR_{CTL}$ and a time code track $TR_{TC}$ are provided longitudinally of the magnetic tape TP. In FIG. 1, arrows DT and DH indicate the direction of tape running and the direction of running of a rotary head, respectively.

Data of a video channel and data of four audio channels are recorded on the helical track $TR_{HEL}$. The digital video data of the video channel and the digital audio data of the four audio channels are recorded on a video sector VS and four audio sectors AS per track of the helical track $TR_{HEL}$, respectively.

Referring to FIG. 2, showing only of the helical tracks $TR_{HEL}$, two of the four audio sectors AS are arrayed at a leading end of the helical track $TR_{HEL}$, while the remaining two audio sectors are arrayed at the trailing end of the track. Video data are recorded in the video sector VS intermediate between these audio sectors AS. Each of the video and audio sectors is made up of a preamble, consisting of a clock run-up sequence, a sync pattern and an ID pattern, a sync block consisting of a sync pattern, an ID pattern, a fixed length data block and error controlling data, and a postamble consisting of a sync pattern and a postamble. An edit gap is provided between each sector in the track $TR_{HEL}$ for preventing timing failure during editing.

With the D-2 format, 1-field of video signals is formed by six helical tracks $TR_{HEL}$. For this reason, two sets of rotary heads, each consisting of two rotary heads, are mounted at an angular distance of 180° with the D-2 format VTR, so that two helical tracks $TR_{HEL}$ are formed by each scanning of the rotary heads of each set. Consequently, data of 1-field are recorded by 1.5 revolutions of the rotary heads. The slanted tracks $TR_{HEL}$ are of track numbers 0 or 1 and segments 0, 1 or 2 shown by $SEG_0$, $SEG_1$ and $SEG_2$, with each field being completed by three segments, as shown in FIG. 3. As for the audio data, the same data are recorded twice, with the data at the upper end and the lower end of the tape being a first copy and a second copy, respectively.

With the D-1 format, the construction of a sync block is the same with audio data as with video data, as shown in FIG. 4.

Each sync block is constituted by a 2-byte sync pattern and two inner code blocks 0 and 1, respectively. The inner code block is made up of 85-byte data and 8-byte inner check data, while the outer check data is arrayed within the 85-byte data. A 2-byte ID pattern is arrayed within an inner code block 0 of the two inner code blocks.

The ID pattern is made up of a sync block number ($ID_0$) indicating an array of sync blocks on a track and a sector ID ($ID_1$) indicating sector attributes, as shown in FIG. 4.

A V/A bit of the sector ID indicates whether a sync block consists of video data or of audio date. A T bit indicates on which of the two tracks (track 0 or track 1) recording is to be made. A segment bit indicates the number of bits for video and audio data. A field bit indicates a color frame sequence for video data. As for audio data, the field bit indicates a field sequence of the number of audio sample recorded from one field to another.

Meanwhile, audio data are recorded separately in four audio channels. FIG. 5 shows the arraying state of the audio data in sectors. The audio data are arrayed in audio blocks each consisting of 12×85 bytes in coincidence with the audio sector AS on the tape. The data part takes up 8×85 of 12×85 bytes, with the remaining 4×85 bytes being data for outer error correction. Since each byte of the video data is made up of 8 bits, whereas each byte of the audio data is made up of 20 bits, 20-bit word data of the audio data may be divided into groups, each consisting of 8 bits, as viewed from the LSB side. FIG. 5A shows this state. Each audio data word is made up of 20 bits, with each audio sector AS consisting of 266 or 267 audio data words. In addition to the audio data, AUX data consisting of four different kinds of auxiliary data are also included in the audio sector.

With the D-2 format, each segment of the audio data has a duration equal to one-third a video field, for keeping timing between the audio data and the video data, as shown in FIG. 6. The segment "0" of the audio data is positioned about 128 audio data samples ahead of a first equalizing pulse for a vertical blanking period of input video signals.

The four channel audio data are recorded twice at upper and lower positions of different tracks on the tape. In FIG. 1, the audio sectors AS are numbered $A_1$, $A_2$, $A_3$ and $A_4$ in association with audio data channels CH1, CH2, CH3 and CH4. A segment having data up to sample number 265 occurs only once every five fields. At this time, data bearing the sample number 266 is entered as data having the sample number 265. The audio segment which occurs once every five fields has 266 samples, with the other segments containing 267 samples. That is, the numbers of samples allocated to the audio sectors in each of the five fields are 800, 801, 801, 801 and 801. Consequently, the recording unit for audio data in the five fields of the video signals is 4004 samples. The period of the five fields is started at an arbitrarily selected field and has it continuity maintained during recording time inclusive of editing time. The start of the 5-field period is indicated by the value of the word count BCNT of an AUX word in the audio sector AS as later described.

The AUX word is 20-bit data generated at an input interface by the input data or subject to user's selection, as shown in FIG. 7. The AUX word is also appended at an output interface. The AUX word consists of 5 4-bit data and 2 9-bit data. For safety sake, EFLG data are recorded four times within each audio block. In FIG. 7, 4-bit channel use data CHAN is the data which determines the specifications of two channels of the input data. The 4-bit preemphasis data PREF decides the turning on or off of preemphasis at audio encoding. The 4-bit audio data word mode data LNGH decides the audio data length while permitting allocation of ancillary bits, that is channel status data, user's data and parity data. The 9-bit block sync position data (S MARK 0, S MARK 1) indicate the leading and trailing ends of the block sync in association with the channel status or user data. The 4-bit word count BCNT is a bit indicating whether the number of input data is 266 or 267 and indicates the beginning point of the 5-field period of audio data. A 4-bit editing flag EFLG indicates an editing point (segment).

Meanwhile, signals of the control track $TR_{CTL}$ of the D-2 format, shown in FIG. 1, are recorded using bias recording. Servo reference pulses $P_{SR}$ of the control track $TR_{CTL}$ are each of a duration of 561 ms±6 μs and recorded continuously, for a period corresponding to two helical tracks $TR_{HEL}$ or to one segment, as shown in FIG. 8. Referring to FIG. 8, a color frame pulse $P_{CF}$ indicates the start of a color framing at the start of recording. If the ID pulse of the video sector is segment 0 and field 0, the color frame pulse is recorded with a delay of 4 T from the servo reference pulse $P_{SR}$. The video frame pulse $P_{VF}$ indicates the first segment of the video frame at the start of recording, and is recorded with a delay of 8 T from the servo reference pulse $P_{SR}$ if the ID pattern of the video sector is for even-numbered from segment 0 field. Editing is carried out in a non-recording area (editing area) between pulse sets.

The cue signals are recorded on the analog audio cue track $TR_{AC}$ shown in FIG. 1 in accordance with an ac bias system or a non-hysteresis system. The reference recording audio level is equal to a mean recording level of a 1 kHz signal recorded at a shorting magnetic flux density of 80±5 nWb/m² per track. On the other hand, the time cord recorded on the time cord track $TR_{TC}$ is recorded in accordance with the ac bias system, and are similar to the cue signals.

With the above described D-2 format, samples are allocated to the audio sectors of each helical track, depending on the number of slanted tracks per field, the number of audio channels and the number of sectors, so that the number of samples is equal to 4004 in five fields.

That is, since the sampling frequency for audio signals is 48 kHz for the D-2 format, the number of samples of video signals that may be recorded in each field of video signals is 800.8 samples, so that the number of samples in each field is not an integer and an integer of 4004 samples is reached in several, herein five fields. For this reason, the numbers of samples to be allocated to the audio sectors in each field are set to 800, 801, 801, 801, 801, as described above, so that the 4004 samples in five fields of the video signals become a recording unit of the audio data.

Consequently, the information indicating the number of samples allocated to each audio sector in the five fields and the recording sequence information indicating the end of the five-field data are required for reproducing the audio data.

With the D-2 format, the recording sequence information is recorded in the AUX word within the audio sector AS of the slanted tracks of one of the five fields so that the recording sequence information may be detected as a pulse occurring once every five fields during reproduction.

However, if the connective recording is desired for editing, the recording sequence information on the recording track is required with the D-2 format. That is, with the D-2 format, since the recording sequence information is not furnished with the recording-only device and hence the recording-only device cannot be used, a playback circuit for reproducing the recording sequence information is required, even if recording is exclusively required as in the case of the connective editing.

Although the foregoing description has been made of the D-2 format VTR as a conventional digital VTR, a so-called 4:2:2 component digital VTR (so-called D-1 format VTR) also is known.

With the D-1 format, the recording sequence information is recorded along with control pulses on a control track provided lengthwise of the magnetic tape. That is, with the D-1 format, the recording sequence information is recorded on the control track as audio frame pulse $P_{AF}$, as shown in FIG. 9. However, the D-1 format is prescribed so that the number of audio data samples is completed with 8008/ten fields or five frames.

If the recording sequence information is recorded on the control track as in the case of the D-1 format, a playback circuit is not required in a recording-only apparatus as discussed in connection with the D-2 format. However, another problem is raised. That is, with the D-2 format, error correction is made during playback on data recorded on the slanted tracks so that the recording sequence information may be produced in a stable manner, so that the D-2 format is especially suited for such case wherein high accuracy is demanded in editing. Conversely, since the recording sequence information is recorded on the longitudinal track with the D-1 format, error correction cannot be made during playback, so that playback becomes impossible if data failure such as data dropout is incurred.

OBJECT AND SUMMARY OF THE INVENTION

In view of the above-depicted status of the art, it is an object of the present invention to provide a recording/reproducing apparatus for digital signals whereby the recording sequence information may be stably obtained in case highly reliable editing is required, and whereby a redundant playback circuitry may be eliminated if only recording is desired to enable the structure to be simplified as well as to enable power consumption to be lowered.

For accomplishing the above object, the present invention provides a recording/reproducing apparatus for digital signals wherein digital audio signals, having the numbers of recording sample data to be recorded are allocated with periodicity based on a predetermined number of fields as a unit, are encoded for error detection and correction and recorded on slanted tracks on a magnetic tape, and wherein the recorded digital audio signals are decoded for error detection and correction and reproduced. The apparatus comprises a sequence signal forming means for forming a sequence signal indicating the periodicity of the digital audio signals on the basis of a field signal of the video signals, longitudinal track recording means for recording the sequence signals on a track provided longitudinally of the magnetic tape, slanted track recording means for recording the sequence signals on the slanted track on which the digital audio signals are recorded, longitudinal track reproducing means for reproducing the sequence signals from the longitudinal track of the magnetic tape, and slanted track reproducing means for reproducing the sequence signals from the slanted track on the magnetic tape. The apparatus also comprises error rate detection means for detecting an error rate of reproduced digital audio signals, and selection means for selecting, responsive to an output of the error rate detection means, the sequence signal outputted from the error rate detection means or the sequence signal outputted from the slanted track reproducing means. The periodicity is discerned based on the sequence signals outputted from the selection means.

Other objects and advantages of the present invention will become more apparent from the following description of the preferred embodiments and the claims.

BRIEF DESCRIPTION OF THE DRAWINGS

Figure 7:
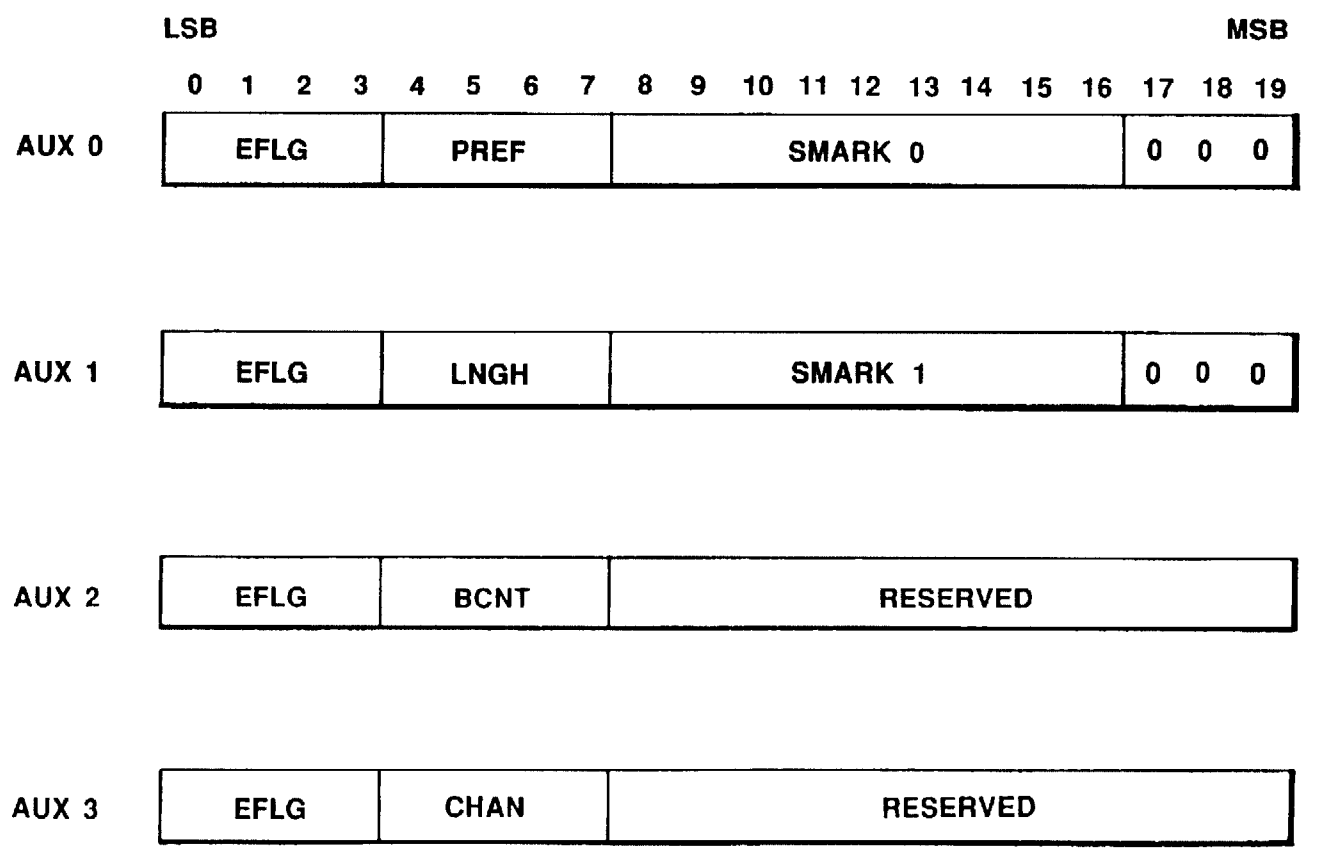

FIG. 7 illustrates AUX data of the D-2 format.

DETAILED DESCRIPTION OF THE PREFERRED EMBODIMENTS

The recording and/or reproducing apparatus for digital signals according to the present invention is designed to record audio data based on a predetermined recording unit. The information indicating a recording sequence of the audio data recorded on the basis of the predetermined recording unit is recorded on both the slanted tracks and a longitudinal track on the magnetic tape TP, as shown in FIG. 1.

Figure 1:
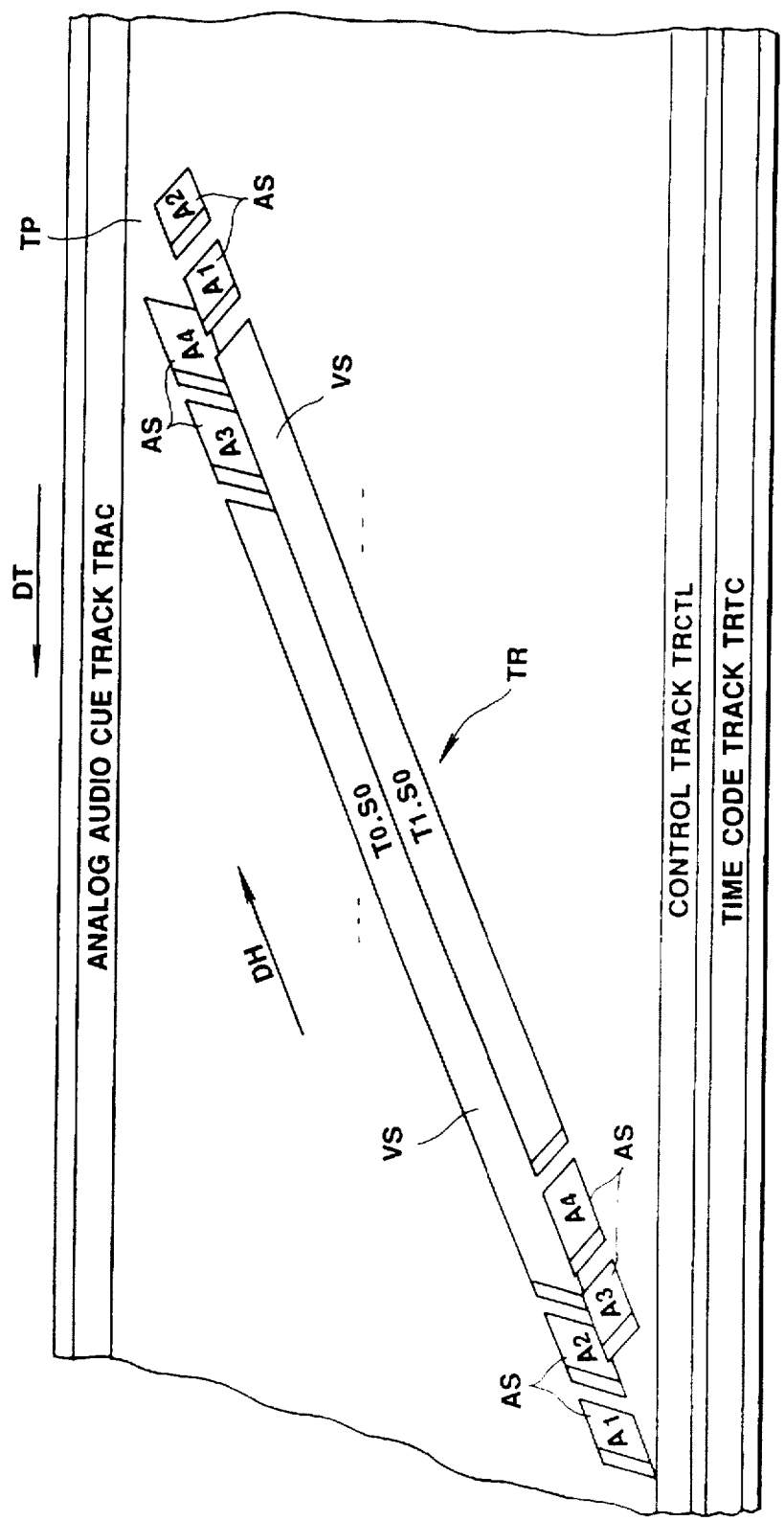
FIG. 1 illustrates the recording track standard for the D-2 format.
Figure 2:
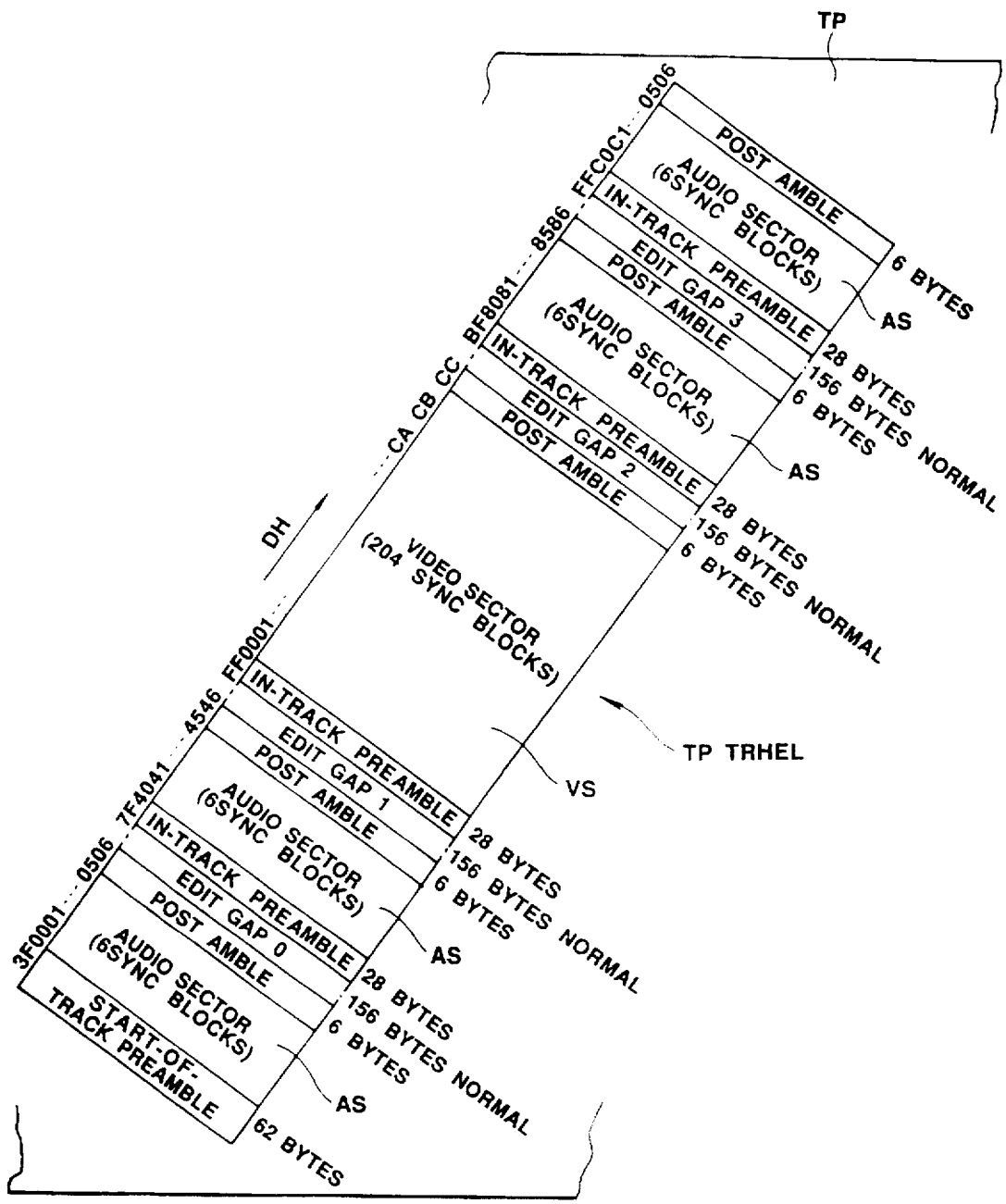
FIG. 2 illustrates the structure of slanted track according to the D-2 format.
Figure 3:
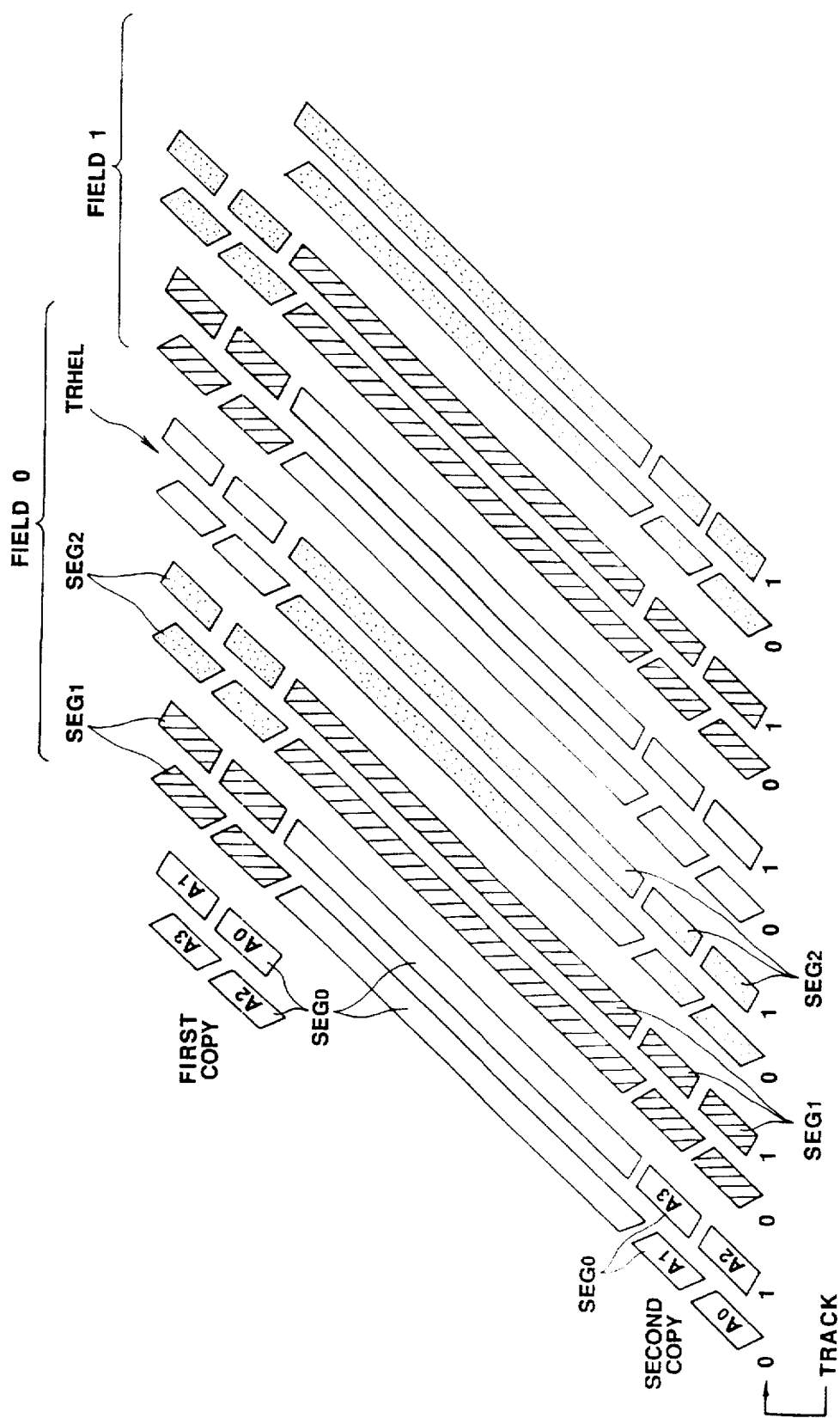
FIG. 3 illustrates track number and segment arrangement on a track of the D-2 format.
Figure 4:
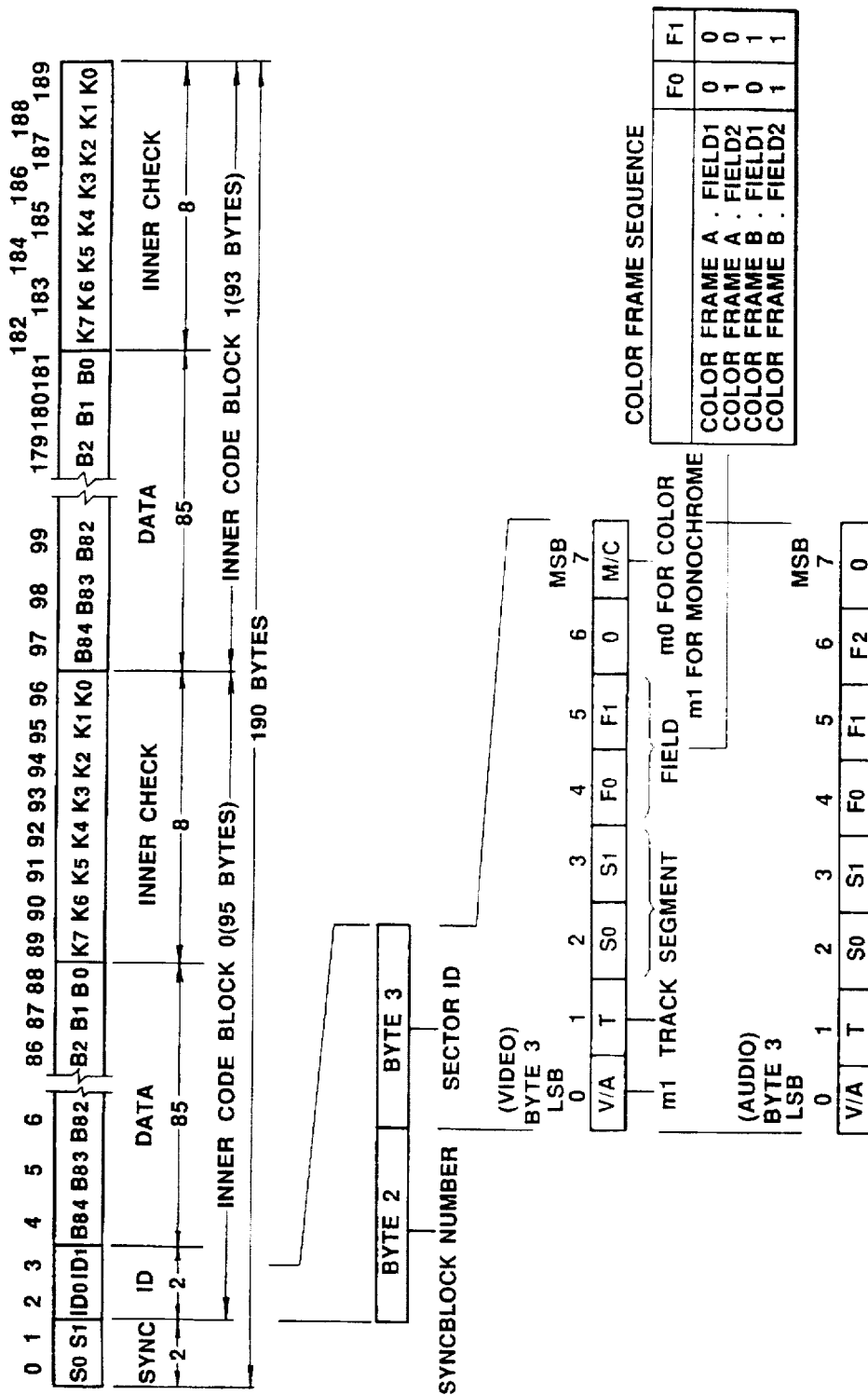
FIG. 4 illustrates the structure of a sync block in the D-2 format.
Figures 5A, 5B:
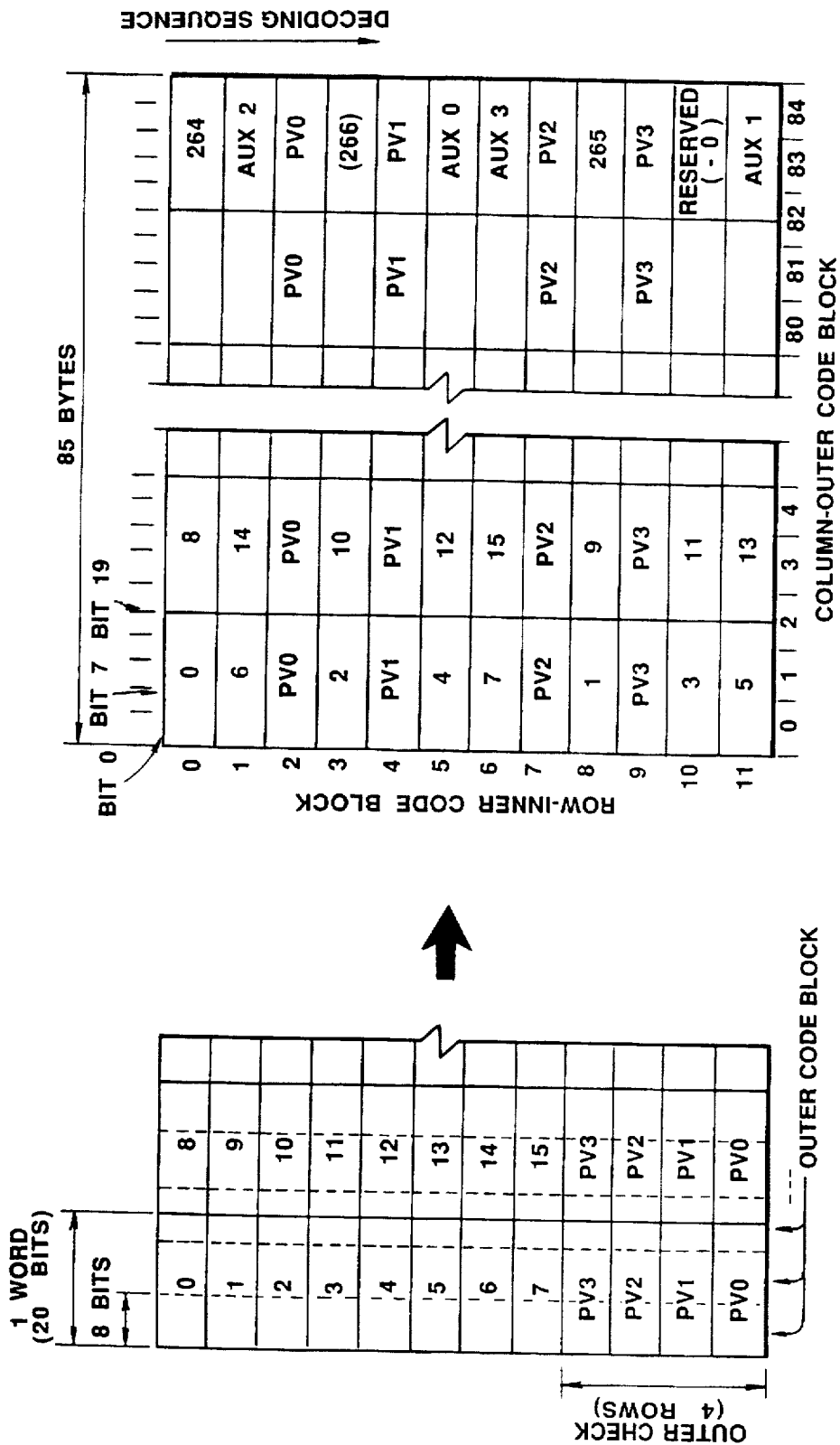
FIG. 5A–5B illustrate arranging of audio sectors for the D-2 format.
Figure 6:
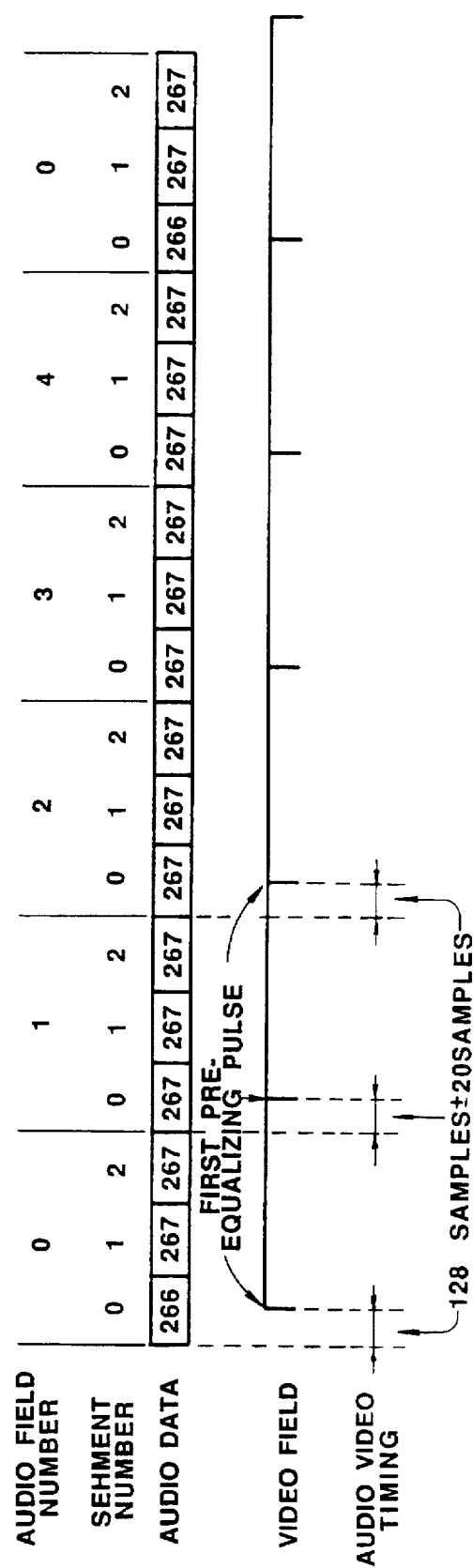
FIG. 6 illustrates the timing between audio and video data for the D-2 format.
Figure 8:
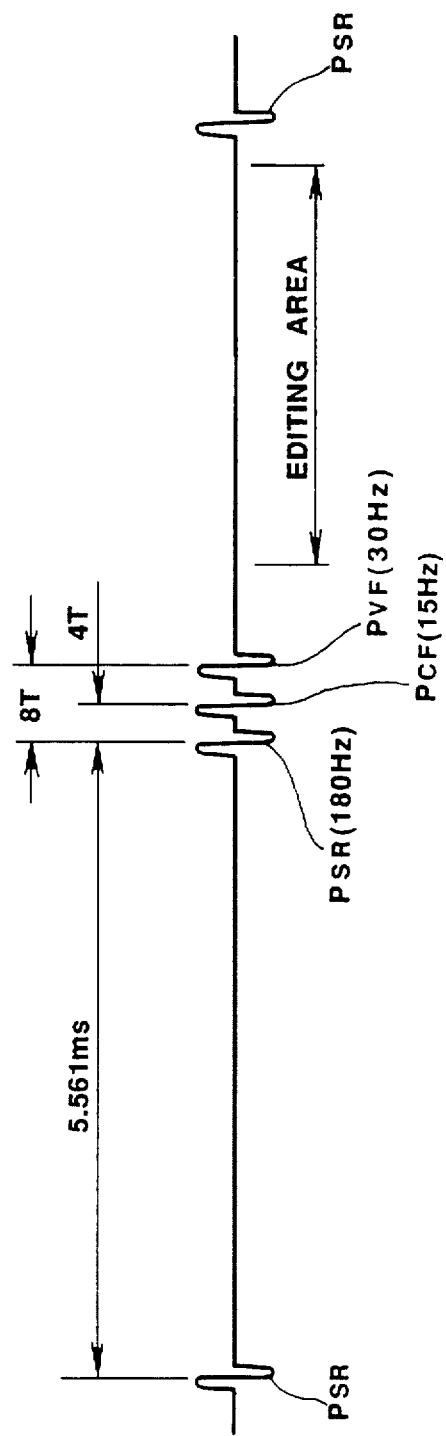
FIG. 8 is a waveform diagram showing a control pulse waveform with the D-2 format.
Figure 9:
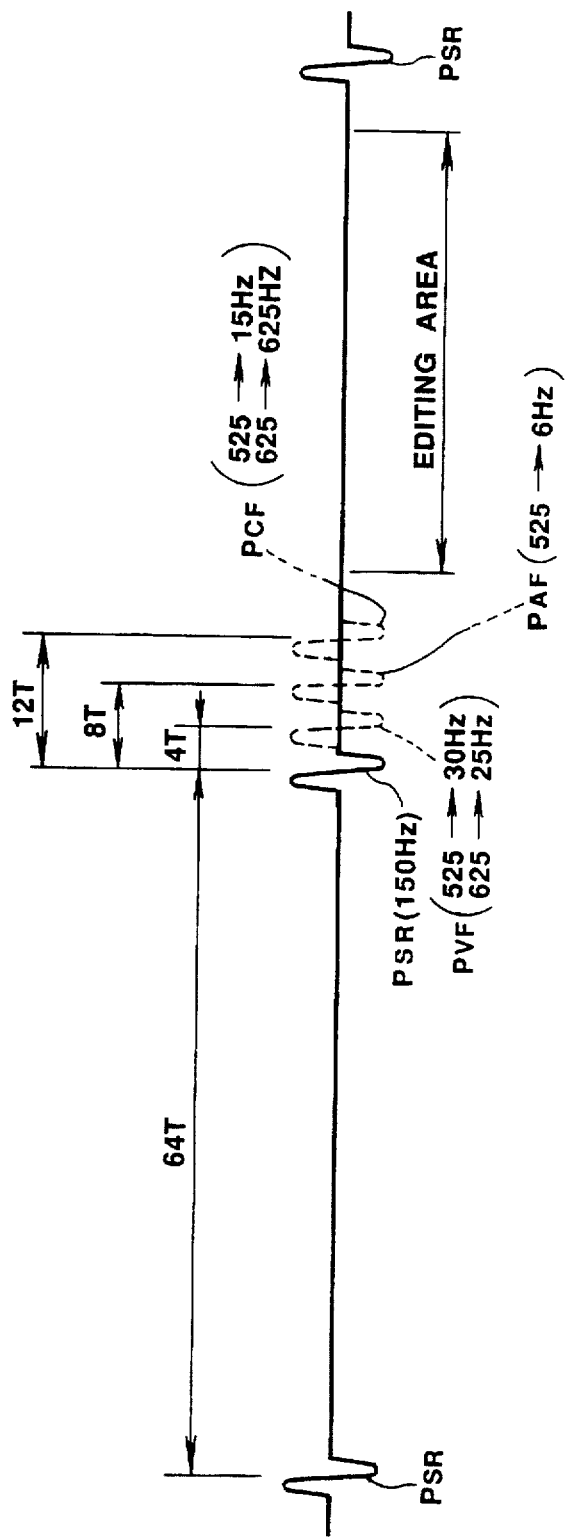
FIG. 9 is a waveform diagram showing a control pulse waveform with the D-1 format.

That is, the digital signal recording/reproducing apparatus according to the present invention is a digital VTR in which the digital audio data and digital video data are recorded on the slanted tracks on the magnetic tape TP, as shown in FIG. 1, wherein the number of samples of the digital audio data is not an integer per field and becomes an integer per several fields, for example, the number of samples of the digital audio data per field is 800.8 and that per five fields becomes equal to 4004, as in the case of the above-mentioned D-2 format. The recording sequence information indicating the end of the digital audio data, that is an audio pulse AP as D-2 digital audio data recording sequence information for which the number of samples becomes equal to 4004 with five fields, is recorded on both the slanted tracks and the longitudinal track on the magnetic tape TP. For replay, the recording sequence information, reproduced from the slanted tracks and the longitudinal track, that is the audio pulse $AP_{HEL}/AP_{CTL}$, is selectively taken out and employed by an error counter 4 and a selector 5, as later explained.

The manner in which video data and audio data are recorded on and reproduced from the slanted tracks on the tape TP by the recording/playback apparatus for digital signals according to the present invention is hereinafter explained.

Figure 10:
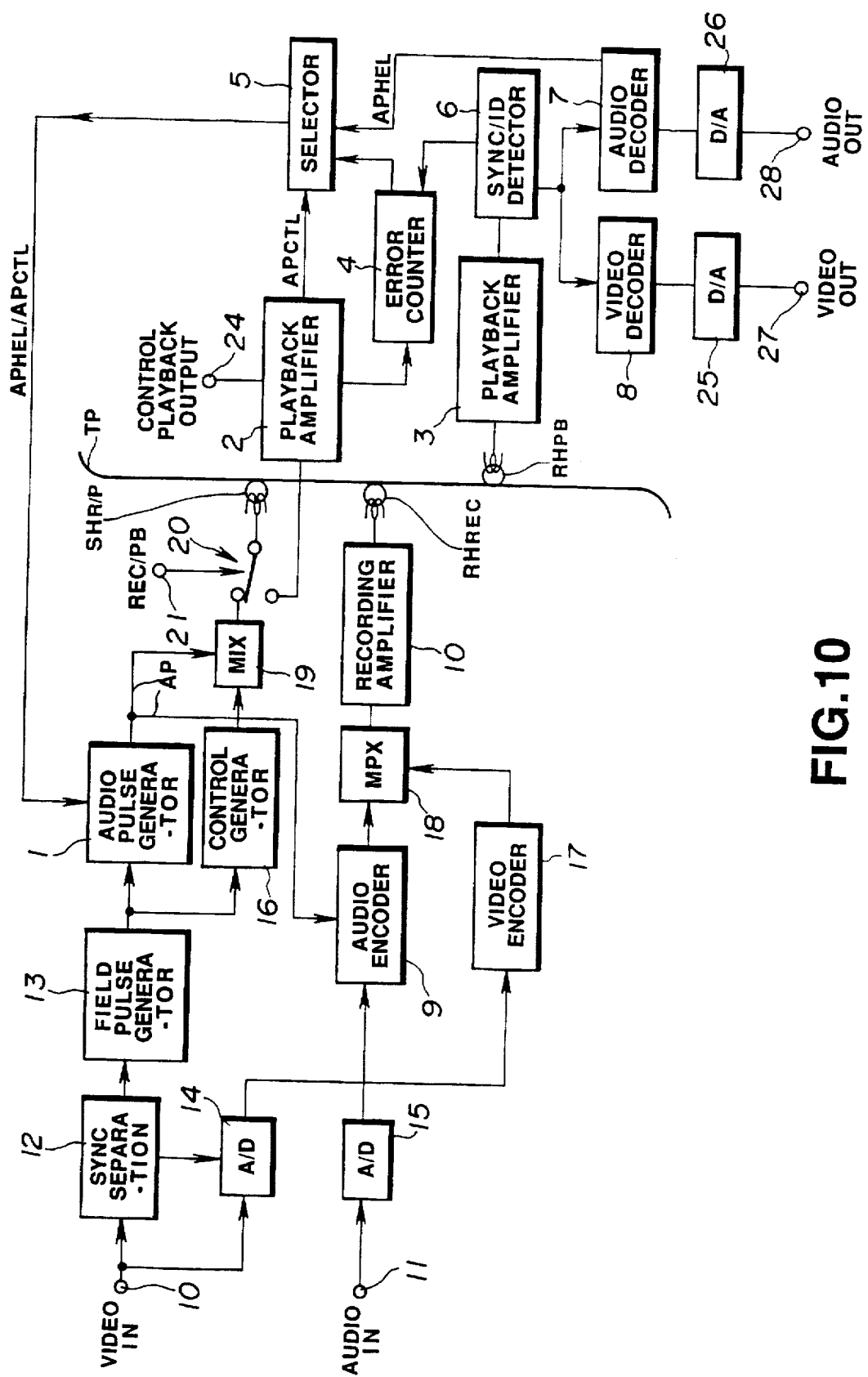
FIG. 10 is a schematic block circuit diagram showing a recording and/or reproducing apparatus for digital signals according to the present invention.

Referring to FIG. 10, analog video signals are supplied to an input terminal 10. The analog video signals are supplied to a synchronization signal separating circuit 12 for separating the analog video signals and to an analog/digital (A/D) converter 14. The analog video signals, supplied to the A/D converter 14 operated on the basis of synchronization signals from the synchronization signal separator 12, are sampled by the A/D converter 12 by linear quantization at a sampling rate of 4 $F_{SC}$ equal to 14.31818 MHz. The sampled data are transmitted to a video encoder 17 where the sampled video data are processed with channel-to-channel shuffling, including intra-line shuffling and sector memory shuffling, appending of outer and inner error code data and channel coding by the so-called mirror square code ($M^2$ code). The digital video data from the video encoder 17 are supplied to a multiplexer 18.

The analog audio signals are supplied to an input terminal 11. These analog audio signals are sampled by an A/D converter 15 at a sampling frequency of 48 kHz and quantized so as to be translated into digital data in 2's complement representation. These digital data are supplied to an audio encoder 9 where they are processed with distribution into four audio channels, data shuffling, generation of AUX data and appending of outer and inner error code data. The digital audio data from audio encoder 9 are also supplied to multiplexer 18.

The multiplexer 18 multiplexes the digital video data, digital audio data and sync/ID data. An output of multiplexer 18 is amplified by a recording amplifier 10 and thence supplied to a rotary recording head $RH_{REC}$ so as to be recorded thereby on slanted tracks of tape TP.

The data recorded on the slanted tracks of tape TP are reproduced by a rotary playback head $RH_{PB}$ so as to be supplied via a sync/ID detection circuit 6 as later described to a video decoder 8 and an audio decoder 7. The data are decoded by the video decoder by an inverse operation to that of encoding by video encoder 17 for taking out digital video signals. Digital video signals from video decoder 8 are processed by a digital/analog (D/A) converter 25 for conversion into analog video signals which are outputted at output terminal 27. The digital audio signals from the audio decoder 7 are converted by D/A converter 26 into analog audio signals which are outputted at an output terminal 28.

The control (CTL) signals, recorded on and reproduced from the longitudinal control track of the tape TP, are hereinafter explained.

The synchronization signals, separated from the analog video signals at the synchronization signal separating circuit 12, are also supplied to field pulse generator 13 where a pulse having a timing corresponding to a field of video signals (field pulse) is generated on the basis of the synchronization signals. The field pulse is supplied to a control generator 16 where a control signal CTL is generated on the basis of the field pulse. The control signal CTL from the CTL generator 16 is supplied via a mixing circuit 19, as later explained, to a fixed terminal a of a changeover switch 20. A movable contact of the changeover switch 20 may be moved between the fixed terminal a and another fixed terminal b depending on a recording/playback mode signal supplied from terminal 21 for indicating recording or replay. If the control signal is to be recorded, the movable contact is changed over to the fixed terminal a of the changeover switch 2 depending on a recording mode signal. The control signal CTL is supplied via changeover switch 20 to a fixed recording/playback head $SH_{R/P}$ for recording on the longitudinal control track of the tape TP.

For reproducing the control signal CTL recorded on the control track of the tape TP, the changeover switch 20 is changed over to the fixed terminal b depending on the playback mode signal. The control signal reproduced from the control track by the fixed recording/playback head $SH_{R/P}$ is transmitted to a playback amplifier 2 via changeover switch 20 changed over to the fixed terminal b. The playback control signal, amplified by playback amplifier 2, is transmitted to a downstream side servo circuit etc. via terminal 24.

Meanwhile, in the present recording/reproducing apparatus for digital signals, the information indicating a recording sequence showing the end of the digital audio data, that is the recording sequence information indicating the end of the D-2 format digital audio data in which the number of samples becomes equal to 4004 by five fields, is recorded simultaneously on the slanted tracks and on the longitudinal track, such as the control track, on the magnetic tape TP. For playback, the recording sequence information reproduced from the slanted tracks and the control track is taken out and employed selectively.

Figure 11:
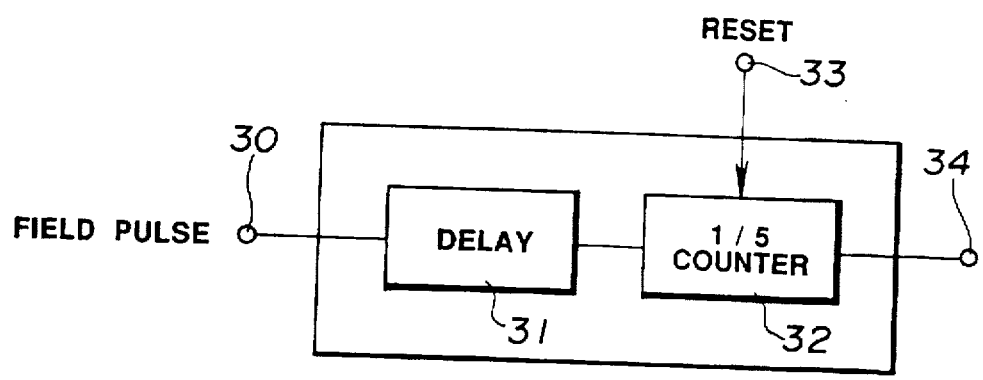
FIG. 11 is a block circuit diagram showing an audio pulse generator constituting the recording and/or reproducing apparatus for digital signals according to the present invention.

To this end, with the recording/playback apparatus for digital signals shown in FIG. 10, the field pulse from the field pulse generator 13 is also transmitted to an audio pulse generator 1 which is designed to generate a pulse as the above-mentioned recording sequence information, referred to herein as an audio pulse AP on the basis of the field pulse once every five fields. Specifically, the audio pulse generator 1 includes a 1/5 counter 32 for frequency-dividing the field pulse transmitted via terminal 30 and passed through a delay circuit 31, as shown in FIG. 11. An output pulse from the 1/5 counter 32, that is the audio pulse AP, is outputted via terminal 34 so as to be transmitted to the audio encoder 9 and to mixing circuit 19.

It is noted that the audio pulse AP, supplied to the mixing circuit 19, is mixed with the control signal CTL from the control signal generator 16 and transmitted to the fixed recording/playback head $SH_{R/P}$ via changeover switch 20 the movable contact of which has been set to the side of the fixed terminal a. The audio pulse AP is recorded on the control track on tape TP by the fixed recording/playback head R/P simultaneously with control signals (CTL signals).

The audio encoder 9, supplied with the audio pulse AP, proceeds to introduce into the ID data the start information for the five fields in which to conclude the audio data as the information corresponding to the audio pulse AP. Alteratively, the start information corresponding to the audio pulse AP may be introduced into the AUX data as part of the AUX data. The audio data, along with the added start information corresponding to the audio pulse AP outputted from the audio encoder 9, is multiplexed with the video data by multiplexer 18 in the same manner as described above so as to be recorded on the slanted tracks on the tape TP via recording amplifier 10 by the rotary recording/playback head $RH_{REC}$.

The data reproduced by the rotary playback head $RH_{PB}$ from the slanted tracks are transmitted to the audio decoder 7 via playback amplifier 3 and sync/ID detection circuit 6. The audio decoder 7 takes out the audio pulse $AP_{HEL}$, corresponding to the start information, from the audio data added to by the start information, in addition to performing the decoding operation in the same manner as described above. The audio pulse $AP_{HEL}$ is supplied to selector 5.

The playback control signal, mixed with the audio pulse AP reproduced from the control track on the tape TP by the fixed recording/playback head $SH_{R/P}$, is supplied to the playback amplifier 2 where the playback control signal is amplified at the same time that the audio pulse AP mixed with the playback control signal is separated. The audio pulse $AP_{CTL}$ thus taken out is supplied to selector 5.

Based on an output of an error counter 4, as later explained, selector 5 selects and outputs one of the audio pulse $AP_{HEL}$ from the audio decoder 7, that is the audio pulse $AP_{HEL}$ read out from the slanted tracks or the audio pulse $AP_{CTL}$ from the playback amplifier 2, that is the audio pulse $AP_{CTL}$ read out from the control track.

Based on the number of errors and/or the status of errors, such as continuous or non-continuous errors, of playback control pulses from the playback amplifier 2, and based on the number of errors and/or the status of errors, such as continuous or non-continuous errors, from the sync/ID detection circuit 6, the error counter 4 generates, for the selector 5, a selection control signal for selecting one of the audio pulses $AP_{CTL}$ from the control track or the audio pulse $AP_{HEL}$ from the slanted track. Specifically, error counter 4 generate the selection control signal for selecting the pulse with a smaller number of errors.

The audio pulse $AP_{HEL}/AP_{CTL}$, with the smaller number of errors, as selected by selector 5, is supplied to terminal 33 of the audio pulse generator 1 shown in FIG. 11. The audio pulse $AP_{HEL}/AP_{CTL}$ supplied to terminal 33 is transmitted as a reset pulse to the 1/5 counter 32.

Figure 12:
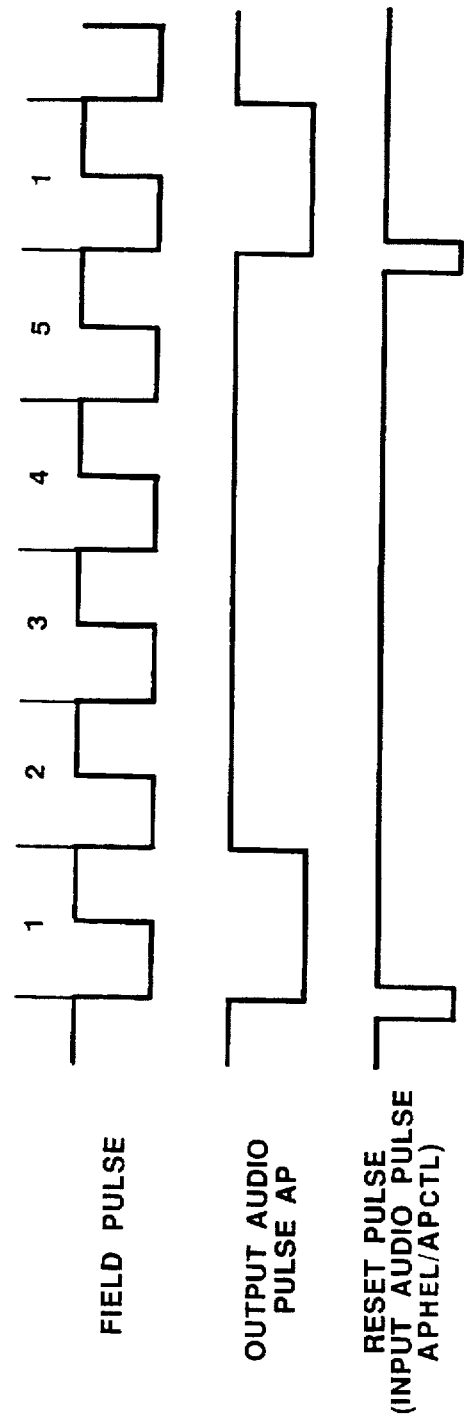
FIG. 12 is a timing chart showing the operation of a 1/5 counter of the audio pulse generator.

The audio pulse generator 1 is reset by the reset pulse, that is the audio pulse $AP_{HEL}/AP_{CTL}$ from selector 5, as shown in FIG. 12, to output an output audio pulse AP which is the field pulse divided in frequency by 1/5. Meanwhile, the delay circuit 31 of the audio pulse generator 1 is provided for compensating the delay caused by the audio pulse (the audio pulse $AP_{HEL}/AP_{CTL}$ reproduced form tape TP) being delayed with respect to the audio pulse AP formed by generator 1 responsive to the field pulse by way of phase matching.

The recording sequence information, produced and selected as described above, is used during decoding of the audio data as signals for discriminating the field sequence of the numbers of samples of the audio data.

The editing operation using the digital signal recording and/or reproducing apparatus according to the present invention is hereinafter explained.

For editing, a preparatory running period is set ahead of an editing point. During the preparatory running period, the mode is the playback mode. The audio pulse $AP_{CTL}$ read from the control track and the audio pulse $AP_{HEL}$ read from the slanted track during the preparatory period are supplied to selector 5 where one of the pulses is selected by the selection control signal from error counter 4. The selected audio pulse $AP_{HEL}/AP_{CTL}$ is entered to the audio pulse generator 1. By the entered audio pulse $AP_{HEL}/AP_{CTL}$, the audio pulse in phase with the 5-field sequence on the tape TP is outputted from the audio pulse generator 1.

In selecting the audio pulse by selector 5 during editing, the audio pulse $AP_{CTL}$ from the control track is selected if the playback signals from the slanted track are replete with errors, and conversely, if the playback signals from the control track are replete with errors, the audio pulse $AP_{HEL}$ from the slanted track is selected, in the same manner as described above. However, a decision as to which audio pulse $AP_{HEL}/AP_{CTL}$ is to be used may also be given depending on the status of errors during the preparatory period preceding the editing point.

If the audio pulse $AP_{HEL}$ from the slanted track is selected by selector 5, the audio pulse AP synchronized with the audio pulse $AP_{HEL}$ is outputted from the audio pulse generator 1 so as to be entered to the audio encoder 9. When the tape runs up to the editing point and the recording/playback apparatus is set to the recording mode, the audio pulse AP is recorded on the slanted track of the tape TP by the rotary recording head $RH_{REC}$ via recording amplifier 10.

If the audio pulse $AP_{CTL}$ from the control track is selected by selector 5, the audio pulse AP synchronized with the audio pulse $AP_{CTL}$ is outputted from audio pulse generator 1. This audio pulse AP is mixed with the control signal CTL from control signal generator 16 by mixing circuit 19. When the tape runs up to the editing point and the recording/playback apparatus is set to the recording mode, the audio pulse AP is recorded on the control track of the tape TP by the fixed recording/playback head $SH_{R/P}$.

With the above-described digital signal recording/playback apparatus, by generating a pulse (audio pulse AP) every five fields by providing the audio pulse generator 1 having the 1/5 counter 32 dividing the field pulse in frequency by 1/5 and by controlling the resetting of the 1/5 counter 32 of the audio pulse generator 1 by the audio pulse $AP_{HEL}/AP_{CTL}$ as selected by selector 5 from the playback side, it becomes possible to keep the recording sequence on the tape TP even during editing.

Although the recording sequence information recorded longitudinally of the tape TP is recorded on the control track as in the D-1 format described above, it is also possible to provide a longitudinal track separate from the control track to record the information on this separate longitudinal track.

Besides, with the present digital signal recording and/or reproducing apparatus, the recording sequence information is recorded on the slanted track as part of the AUX data or ID data and is handled as part of data subject to error correction. Consequently, the recording sequence information may be improved in reliability as data appearing on the playback side. In addition, since the information is simultaneously recorded on the longitudinal track, no trouble is caused during editing of the audio data even although the errors on the slanted track are increased slightly. That is, with the recording/reproducing apparatus for digital signals according to the present invention, a reliable operation may be assured because the recording sequence information may be retained unless the information is lost from both the slanted track and the longitudinal track simultaneously.

Although the above-described embodiment is directed to a recording/playback arrangement, the present invention may be applied to an apparatus adapted only for recording information signals. In such a case, the connective recording during editing is enabled using the recording information on the longitudinal track to realize a savings in labor and power consumption.

What is claimed is:

1. In an apparatus for recording and/or reproducing digital audio and video signals in slanted tracks on a magnetic tape, and wherein an integral number of samples of said digital audio signals forming a unit thereof are allocated to a plurality of fields of said digital video signals, said apparatus comprising sequence signal forming means for forming sequence signals indicating the units of said digital audio signals on the basis of said fields of said digital video signals, longitudinal track recording means for recording said sequence signals in a longitudinal track on said magnetic tape, slanted track recording means for recording said sequence signals in the slanted tracks in which said digital audio signals are recorded, longitudinal track reproducing means for reproducing said sequence signals from said longitudinal track, slanted track reproducing means for reproducing the recorded digital audio signals and said sequence signals from said slanted tracks.

error rate detection means for detecting an error rate of the sequence signals reproduced from said longitudinal track and an error rate of the sequence signals reproduced with the digital audio signals from said slanted tracks. and selection means for selecting the sequence signals reproduced from said longitudinal track or the sequence signals reproduced from said slanted tracks based on whether said error rate detection means detects a lower error rate of the reproduced sequence signals from said longitudinal track or from said slanted tracks, respectively.

2. The apparatus as claimed in claim 1, wherein said longitudinal track is a control track and said longitudinal track recording means comprises signal combining means for combining said sequence signals with corresponding control signals indicating recording units of said digital video signals, so as to produce combined signals which are recorded in said control track.

3. The apparatus as claimed in claim 1, wherein said longitudinal track contains essentially only said sequence signals.

4. The apparatus as claimed in claim 1, wherein said digital audio signals are encoded in data blocks having auxiliary data regions, and said slanted track recording means records said sequence signals in said auxiliary data regions.

5. The apparatus as claimed in claim 4, further comprising encoding means for detecting and correcting errors in said sequence signals and in said digital audio signals.

6. The apparatus as claimed in claim 1, wherein said digital audio signals are encoded in data blocks having data block discriminating regions, and said slanted track recording means records said sequence signals in said data block discriminating regions.

7. The apparatus as claimed in claim 6, further comprising encoding means for detecting and correcting errors in said sequence signals and in said digital audio signals.

8. The apparatus as claimed in claim 1, wherein said sequence signals further indicate an end point of each of said units of said digital audio signals.

9. The apparatus as claimed in claim 1, further comprising means for matching a phase of said sequence signals formed by said sequence signal forming means to a phase of the sequence signals selected by said selection means.

10. In an apparatus for recording and/or reproducing digital audio and video signals in slanted tracks on a magnetic tape, and wherein an integral number of samples of said digital audio signals forming a unit thereof are allocated to a plurality of fields of said digital video signals, said apparatus comprising:

sequence signal forming means for forming sequence signals indicating the units of said digital audio signals on the basis of said fields of said digital video signals;

longitudinal track recording means for recording said sequence signals in a longitudinal track on said magnetic tape;

slanted track recording means for recording said sequence signals in the slanted tracks in which said digital audio signals are recorded;

longitudinal track reproducing means for reproducing said sequence signals from said longitudinal track;

slanted track reproducing means for reproducing the recorded digital audio signals and said sequence signals from said slanted tracks;

error rate detection means for detecting an error rate of the sequence signals reproduced from said longitudinal track and an error rate of the sequence signals reproduced with the digital audio signals from said slanted tracks; and selection means for selecting the sequence signals reproduced from said longitudinal track or the sequence signals reproduced from said slanted tracks based on whether said error rate detection means detects a lower error rate of the reproduced sequence signals from said longitudinal track or from said slanted tracks, respectively, said apparatus including an editing mode having a preparatory running period for editing said digital audio signals recorded on said magnetic tape, wherein, upon establishment of said editing mode, said sequence signals are reproduced during said preparatory running period by said longitudinal and slanted track reproducing means and the sequence signals reproduced by either the longitudinal or slanted track reproducing means having the lower detected error rate are selected by said selection means and supplied to said longitudinal and slanted track recording means through said sequence signal forming means.

11. The apparatus as claimed in claim 10, wherein said sequence signals further indicate an end point of each of said units of said digital audio signals.

12. In an apparatus for recording and/or reproducing digital audio and video signals in slanted tracks on a magnetic tape, and wherein an integral number of samples of said digital audio signals forming a unit thereof are allocated to a plurality of fields of said digital video signals and sequence signals are recorded in both a longitudinal track and said slanted tracks on said magnetic tape for indicating the units of said digital audio signals on the basis of said fields of said digital video signals, said apparatus comprising longitudinal track reproducing means for reproducing said sequence signals from said longitudinal track, slanted track reproducing means for reproducing the recorded digital audio signals and said sequence signals from said slanted tracks, error rate detection means for detecting an error rate of the sequence signals reproduced from said longitudinal track and an error rate of the sequence signals reproduced with the digital audio signals from said slanted tracks, and selection means for selecting the sequence signals reproduced from said longitudinal track or the sequence signals reproduced from said slanted tracks based on whether said error rate detection means detects a lower error rate of the sequence signals reproduced from said longitudinal track or from said slanted tracks, respectively.

13. The apparatus as claimed in claim 12, wherein said sequence signals are recorded in combination with corresponding control signals in said longitudinal track, and said longitudinal track reproducing means reproduces said sequence signals and said corresponding control signals from said longitudinal track, said control signals indicating a recording unit of said digital video signals.

14. The apparatus as claimed in claim 12, wherein said longitudinal track contains essentially only said sequence signals.

15. The apparatus as claimed in claim 12, wherein said digital audio signals are encoded in data blocks having auxiliary data regions, and said slanted track reproducing means reproduces said sequence signals from said auxiliary data regions.

16. The apparatus as claimed in claim 12, wherein said digital audio signals are encoded in data blocks having data block discriminating regions in which said sequence signals are recorded, and said slanted track reproducing means reproduces said sequence signals from said data block discriminating regions.

17. The apparatus as claimed in claim 12, further comprising means for matching a phase of said sequence signals formed by said sequence signal forming means to a phase of the sequence signals selected by said selection means.

18. The apparatus as claimed in claim 12, wherein said sequence signals further indicate an end point of each of said units of said digital audio signals.

* * * * *